United States Patent
Sato et al.

(10) Patent No.: US 8,502,407 B2
(45) Date of Patent: Aug. 6, 2013

(54) WIND POWER GENERATING APPARATUS

(75) Inventors: Shinsuke Sato, Tokyo (JP); Shigeto Hirai, Tokyo (JP); Taisuke Nakamura, Tokyo (JP); Takeshi Matsuo, Tokyo (JP); Chuuhachi Gotou, Tokyo (JP); Yasushi Okano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/449,554

(22) Filed: Apr. 18, 2012

(65) Prior Publication Data

US 2012/0256425 A1 Oct. 11, 2012

Related U.S. Application Data (63) Continuation of application No. PCT/JP2012/053015, filed on Feb. 9, 2012.

(30) Foreign Application Priority Data

Feb. 25, 2011 (JP) ................................. 2011-040368

(51) Int. Cl.
*F03D 9/00* (2006.01)
(52) U.S. Cl.
USPC .......................................................... 290/55
(58) Field of Classification Search
USPC ........................................ 290/52–55, 42–44
See application file for complete search history.

(56) References Cited

U.S. PATENT DOCUMENTS

| | | | | |
|---|---|---|---|---|
| 7,042,109 | B2 * | 5/2006 | Gabrys | 290/44 |
| 7,075,192 | B2 * | 7/2006 | Bywaters et al. | 290/55 |
| 8,274,170 | B2 * | 9/2012 | Kassner | 290/55 |
| 2006/0152016 | A1 * | 7/2006 | Bywaters et al. | 290/55 |
| 2007/0222223 | A1 * | 9/2007 | Bagepalli et al. | 290/55 |
| 2008/0050234 | A1 * | 2/2008 | Ingersoll et al. | 416/132 B |
| 2008/0118342 | A1 * | 5/2008 | Seidel et al. | 415/1 |
| 2008/0290664 | A1 * | 11/2008 | Kruger | 290/55 |
| 2009/0045628 | A1 * | 2/2009 | Erdman et al. | 290/44 |
| 2009/0060748 | A1 | 3/2009 | Landa et al. | |
| 2009/0094981 | A1 * | 4/2009 | Eggleston | 60/641.2 |
| 2009/0206610 | A1 * | 8/2009 | Martin et al. | 290/55 |

(Continued)

FOREIGN PATENT DOCUMENTS

| | | |
|---|---|---|
| JP | 53151507 U | 11/1978 |
| JP | 11178282 A | 7/1999 |

(Continued)

OTHER PUBLICATIONS

International Search Report and Written Opinion for PCT/JP2012/053015, dated Apr. 24, 2012.

*Primary Examiner* — Jean F Duverne
(74) *Attorney, Agent, or Firm* — Kanesaka Berner & Partners, LLP (57) ABSTRACT

A wind power generating apparatus provided with heat exhausting measures for an in-rotor-head device is provided. In a wind power generating apparatus in which a rotor head that rotates upon receiving wind power on a wind turbine blade drives a generator that is installed inside a nacelle and thereby generates electric power, the nacelle is installed on an upper end portion of a tower that is erected on a foundation, and a hub control panel is installed inside the rotor head, a ventilating fan that forms a flow inside and outside of an enclosure of the hub control panel is provided in the enclosure.

14 Claims, 4 Drawing Sheets

(56) References Cited

U.S. PATENT DOCUMENTS

2010/0117362 A1* 5/2010 Vihriala et al. ............... 290/52
2010/0123318 A1* 5/2010 Casazza et al. ............... 290/55
2010/0148514 A1 6/2010 Sato et al.

FOREIGN PATENT DOCUMENTS

| JP | 2000166177 A | 6/2000 |
|---|---|---|
| JP | 2001211808 A | 8/2001 |
| JP | 2009091929 A | 4/2009 |

* cited by examiner

WIND POWER GENERATING APPARATUS

CROSS-REFERENCE TO RELATED APPLICATIONS

This is a continuation application of International Application No. PCT/JP2012/053015, filed Feb. 9, 2012, and claims priority from Japanese Patent Application No. 2011-040368, filed Feb. 25, 2011, the contents of which are incorporated herein by reference in their entirety.

TECHNICAL FIELD

The present invention relates to a wind power generating apparatus which favorably maintains an atmosphere in a control panel installed inside a rotor head.

BACKGROUND ART

Wind power generating apparatuses (also referred to as "wind turbine" below) are apparatuses which generate electric power when a rotor head having a wind turbine blade rotates upon receiving wind power and the speed of rotation is increased by a gear box to drive a generator.

The rotor head described above is mounted to an end portion of a nacelle that is installed on a wind turbine tower (referred to as "tower" below) and can yaw. The rotor head is supported so as to be rotatable about a rotation axis in a substantially-horizontal lateral direction.

Figure 5:
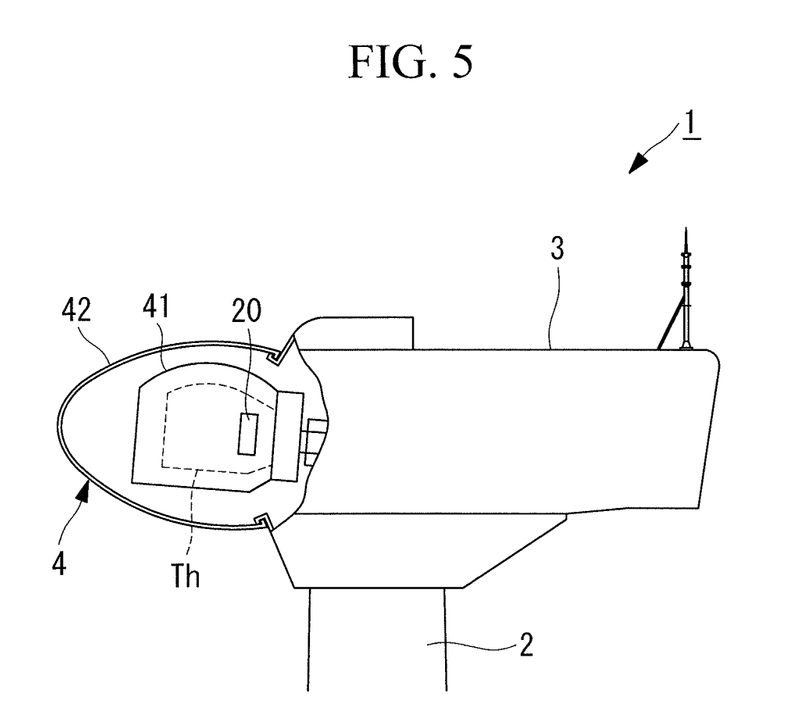
FIG. 5 is a schematic configuration view showing a conventional structure inside a rotor head.

In a conventional wind power generating apparatus 1 shown in FIG. 5, reference numeral 2 in the drawing denotes a tower, 3 a nacelle, and 4 a rotor head. A wind turbine blade mounted to the rotor head 4 is omitted.

The rotor head 4 of the wind power generating apparatus 1 is configured such that a head cover 42 made of resin covers the periphery of a rotor head body 41 as a mold component. An in-head device such as a hub control panel 20 and a main bearing 10 is installed inside the rotor head body 41. Since the in-head device as described above generates heat during operation of the wind power generating apparatus 1, exhaust heat is generated from the in-head device inside the rotor head 4.

Meanwhile, the above in-head device needs to be protected from moisture or salt according to an installation environment of the wind power generating apparatus 1. Thus, the rotor head body 41 has a sealed structure from outside air, so that the exhaust heat of the in-head device such as the hub control panel 20 tends to be stored in the structure.

For example, stable operation is not ensured for electric control devices such as the hub control panel 20 in a high-temperature atmosphere having a predetermined temperature or more due to an upper limit of temperature conditions set for a constituent electric component or the like. Thus, it is concerned that operation continuation of the wind power generating apparatus 1 is affected. That is, when the hub control panel 20 has a high internal temperature at a predetermined temperature or more, it is difficult for the wind power generating apparatus 1 to continue stable operation.

As a technique for cooling the above internal device of the rotor head, it has been proposed to provide an air inlet opening in a leading end portion of the rotor head, for example (e.g., see Patent Literature 1).

CITATION LIST

Patent Literature

{PTL 1}
United States Patent Application Publication No. 2009/0060748

SUMMARY OF INVENTION

Technical Problem

As described above, when the rotor head body 41 of the wind power generating apparatus 1 has a sealed structure, the wind power generating apparatus 1 has difficulty in continuing stable operation due to a rise in the internal temperature since devices that generate heat (referred to as "heat generating device" below) are installed inside the rotor head body 41.

Moreover, since a centrifugal force is applied by rotation of the rotor head 4 during the operation of the wind power generating apparatus 1, such a temperature distribution that the device exhaust heat is stored in a region of a center portion close to a rotating shaft (a high-temperature region Th enclosed by a dashed line) and the region has a high temperature as shown in FIG. 5 is formed inside the rotor head body 41. That is, the temperature distribution is formed inside the rotor head body 41 and the head cover 42 such that the temperature decreases from the center portion close to the rotating shaft toward an outer peripheral surface of the head cover 42.

Thus, the exhaust heat of the in-head device generated during the operation of the wind power generating apparatus 1 is difficult to effectively dissipate from the rotor head 4 to outside air since there is a small temperature difference between outer surface temperatures of the rotor head body 41 and the rotor head cover 42 and an outside air temperature. Therefore, the exhaust heat is not dissipated to outside air and tends to be stored inside the rotor head body 41. The temperature of the high-temperature region Th tends to further rise to a higher temperature. Based on such background, there is a demand for heat exhausting measures for the in-rotor-head device in the wind power generating apparatus.

The present invention has been made in view of the above circumstances, and it is an object thereof to provide a wind power generating apparatus provided with heat exhausting measures for an in-rotor-head device.

Solution to Problem

In order to solve the above object, the present invention employs the following solutions.

A wind power generating apparatus according to the present invention is a wind power generating apparatus in which a rotor head that rotates upon receiving wind power on a wind turbine blade drives a generator that is installed inside a nacelle and thereby generates electric power, the nacelle is installed on an upper end portion of a tower that is erected on a foundation, and a heat generating device is installed inside the rotor head, wherein a ventilating fan that forms a flow of air inside and outside of an enclosure of the heat generating device is provided in the enclosure.

With the wind power generating apparatus, since the ventilating fan that forms the flow of air inside and outside the enclosure of the heat generating device is provided in the enclosure, an internal temperature of the heat generating device can be kept low by venting exhaust heat stored in the enclosure of the heat generating device, and the flow of air is generated so as to stir an inner portion of a rotor head body as a sealed space. Thus, an air temperature inside the rotor head body can be equalized. Moreover, heat exchange between inside and outside of the rotor head body can be facilitated. It is thus not necessary to separately install fans for the respective purposes, and the present invention is advantageous in view of cost and arrangement space.

In the above wind power generating apparatus, the ventilating fan may be arranged so as to form an air flow passing through a center portion of the rotor head body. Accordingly, high-temperature air around a rotation axis is easily stirred, and a temperature distribution of air formed inside the rotor head can be resolved and substantially equalized.

In the above invention, particularly the heavy heat generating device such as a control panel may be arranged adjacent to an axis of the rotor head so as to prevent a rotating shaft of the rotor head from becoming eccentric.

In the above invention, the ventilating fan may be installed on at least one surface out of opposing surfaces of surfaces of the enclosure in a rotation axial direction of the rotor head. That is, the ventilating fan installation surface of the enclosure may be any of one surface on a rotor head leading end side in the rotation axial direction, one surface on a main bearing side (the nacelle side) in the rotation axial direction, or the opposing surfaces on the rotor head leading end side and the main bearing side in the rotation axial direction.

Also, a fan that blows air inside the enclosure of the heat generating device toward the center portion of the rotor head, or a fan that blows air inside the enclosure of the heat generating device toward a nacelle-side surface of an inner wall of the rotor head body may be used as the ventilating fan.

In the above invention, the ventilating fan may be an exhaust fan that allows air inside the enclosure to flow out of the enclosure, and a pressure loss element may be mounted to an air inlet of the enclosure. Accordingly, foreign objects such as rain water can be prevented or inhibited from entering the heat generating device.

The pressure loss element in this case means a louver, a dust removal filter, a salt removal filter or the like.

Advantageous Effects of Invention

With the present invention described above, heat exhausting measures for venting the exhaust heat stored in the heat generating device such as a control panel and thereby keeping the internal temperature of the heat generating device low is provided. The heat generating device is thereby prevented from assuming a high-temperature atmosphere exceeding an upper limit of temperature conditions set for an electric component or the like constituting the heat generating device, and stable operation continuation is ensured.

In addition to the heat exhausting measures for venting the exhaust heat in the heat generating device to facilitate heat dissipation, the air inside the rotor head body is stirred and the temperature distribution is resolved. Thus, there is a larger temperature difference between inside and outside of the rotor head body, and the heat dissipation from the rotor head body is facilitated. That is, the exhaust heat in the rotor head body is effectively dissipated to outside, and an atmosphere in the rotor head body is maintained at a predetermined temperature or less, so that the heat generating device can continue stable operation.

DESCRIPTION OF EMBODIMENTS

In the following, one embodiment of a wind power generating apparatus according to the present invention will be described based on the drawings.

Figure 2:
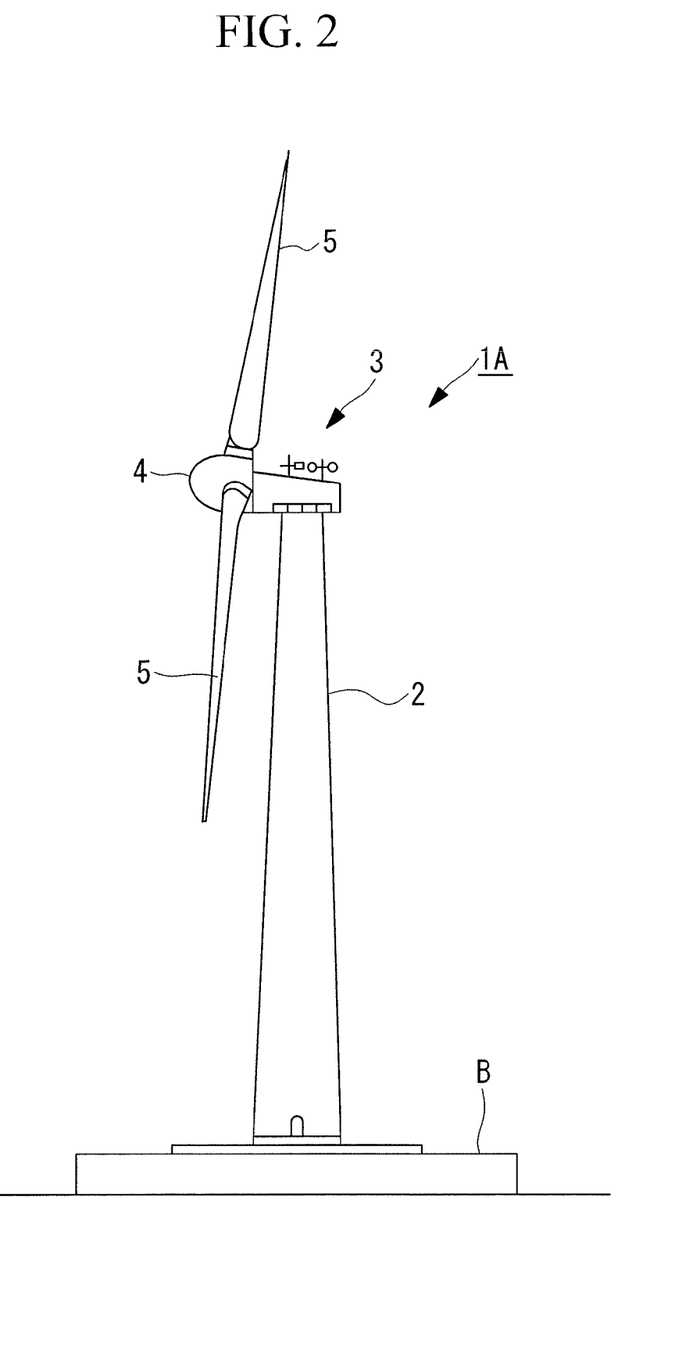
FIG. 2 is a side view showing an outline of the wind power generating apparatus.

As shown in FIG. 2, a wind power generating apparatus 1A includes a wind turbine tower (referred to as "tower" below) 2 erected on a foundation B, a nacelle 3 installed on an upper end of the tower 2, and a rotor head 4 supported rotatably about a rotation axis in a substantially-horizontal lateral direction and provided on a leading end portion side of the nacelle 3.

A plurality of (e.g., three) wind turbine blades 5 are mounted to the rotor head 4 radially around the rotation axis. Power of wind hitting the wind turbine blades 5 from a rotation axial direction of the rotor head 4 is thereby converted into power to rotate the rotor head 4 about the rotation axis.

An anemometer that measures a wind speed value in the surroundings, an anemoscope that measures a wind direction, or the like are installed at an appropriate position (e.g., an upper portion) of an outer peripheral surface of the nacelle 3.

That is, in the wind power generating apparatus 1A, the rotor head 4 that rotates about the substantially-horizontal rotation axis upon receiving wind power on the wind turbine blades 5 drives a generator (not shown) installed inside the nacelle 3 and thereby generates electric power, and the nacelle 3 is installed on the upper end portion of the tower 2 erected on the foundation B, and can yaw.

The tower 2 in the drawing is of a monopole type made of steel. The tower 2 is obtained as a cylindrical tower in which a required length (height) is ensured by connecting flanges (not shown) of a plurality of divided tower sections.

First Embodiment

Figure 1A:
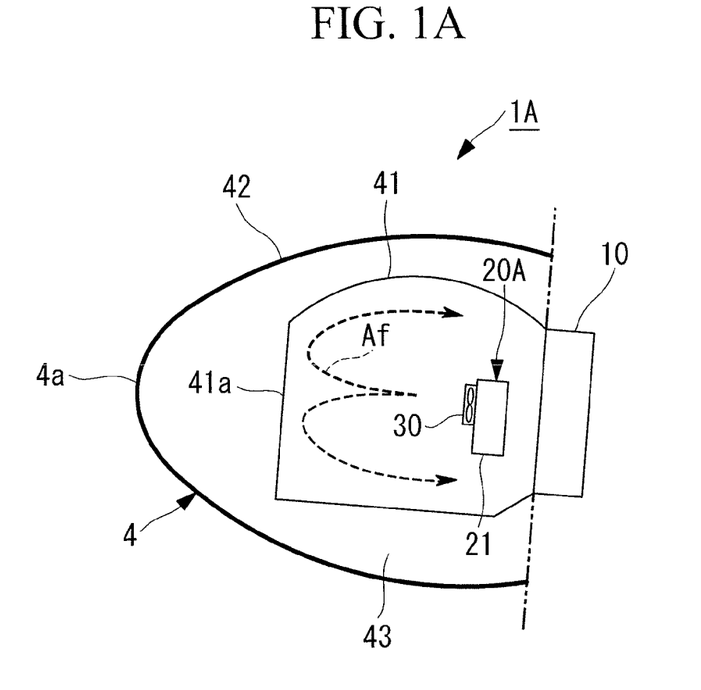
FIG. 1A is a view showing a first embodiment of a wind power generating apparatus according to the present invention, and is a schematic configuration view inside a rotor head.

The rotor head 4 of the wind power generating apparatus 1A described above includes a rotor head body 41, and a head cover 42 as shown in FIG. 1A, for example. The rotor head body 41 is normally a mold component. The head cover 42 made of resin covers the outer periphery of the rotor head body 41 so as to form a space portion 43 around the rotor head body 41.

In-head devices such as electric devices like a control panel composed of a plurality of electric components, e.g., a hub control panel 20A that hydraulically pitch-controls the wind turbine blades 5, and a driving-system component having a sliding portion, e.g., a main bearing 10, are installed inside the rotor head 4. The in-head devices as described above are heat generating devices that generate heat during operation of the wind power generating apparatus 1A, and need to be protected from moisture or salt according to an installation environment of the wind power generating apparatus 1A. Thus, the rotor head body 41 has a sealed structure from outside air.

Figure 1B:
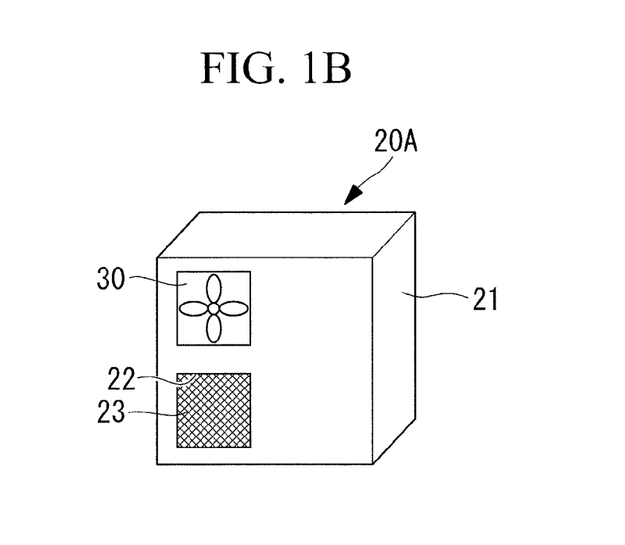
FIG. 1B is a view showing the first embodiment of the wind power generating apparatus according to the present invention, and is a perspective view showing an appearance of a control panel.

Of the devices, a ventilating fan 30 that forms a flow in air inside an enclosure 21 is provided in a control panel of the in-head device such as the hub control panel 20A. In a configuration example shown in the drawing, the ventilating fan 30 is mounted to one surface of the enclosure 21 having a rectangular parallelepiped shape. A pressure loss element 23 is also mounted to an air inlet 22 that opens in the same enclosure surface as the ventilating fan. The pressure loss element 23 prevents foreign objects such as rain and dust from entering the hub control panel 20A, and a louver or dust removal and salt removal filters are effectively used, for example.

The ventilating fan 30 is an exhaust fan that sucks out the air inside the enclosure 21, and allows the in-enclosure air whose temperature rises due to exhaust heat to flow out of the enclosure 21 (into the rotor head body 41 of the rotor head 4). Meanwhile, since in-head air of the rotor head body 41 is introduced into the enclosure 21 from the air inlet 22 by the operation of the ventilating fan 30, the in-enclosure air having a high temperature is exchanged with the in-head air having a relatively low temperature.

In this case, the ventilating fan 30 is installed on a surface of the enclosure 21 on a rotor head leading end 4a side (a surface on the left side of the paper in FIG. 1A) in the rotation axial direction of the rotor head 4.

With the wind power generating apparatus 1A as described above, since the enclosure 21 of the hub control panel 20A includes the ventilating fan 30 that forms the flow in the in-enclosure air, exhaust heat stored in the control panel can be vented, and an internal temperature can be kept low. The enclosure 21 of the hub control panel 20A is prevented from assuming a high-temperature atmosphere exceeding an upper limit of temperature conditions set for a constituent component such as an electric component, so that the hub control panel 20A can continue stable operation.

The air flow discharged outside of the enclosure 21 also stirs an inner portion of the rotor head body 41. As a result, an air temperature inside the rotor head body 41 can be equalized. It is thus not necessary to separately install fans for the respective purposes, and the present invention is advantageous in view of cost and arrangement space.

The ventilating fan 30 of the wind power generating apparatus 1A described above may be arranged so as to form an air flow passing through a center portion of the rotor head body 41.

Also, in the above invention, particularly the heavy heat generating device such as the control panel may be arranged adjacent to the axis of the rotor head so as to prevent a rotating shaft of the rotor head from becoming eccentric. For example, the hub control panel 20A is installed on the nacelle 3 side of the rotor head body 41, and positioned such that a rotating shaft center of the ventilating fan 30 substantially corresponds to the rotating shaft center of the rotor head 4 as shown in an aspect in FIG. 1A. The air flow flowing out of the enclosure 21 thereby passes through the center portion of the rotor head body 41.

The ventilating fan 30 installed as described above forms a circulation flow of the in-head air (a dashed arrow Af in the drawing) in the rotor head body 41 of the rotor head 4. The circulation flow first flows through the shaft center portion in the rotor head body 41 from the nacelle 3 side to the rotor head leading end 4a side. The circulation flow then changes its direction with a flow path being blocked by a leading end surface 41a of the rotor head body 41, and is turned back along an inner wall surface of the rotor head body 41.

As a result, the circulation flow in the rotor head body 41 finally returns to a trailing end side of the rotor head body 41, so that the air inside the rotor head body 41 is effectively stirred, and a temperature distribution formed in the rotor head body 41 is resolved and substantially equalized.

Also, high-temperature air tends to be concentrated into the center portion inside the rotor head body 41 due to a centrifugal force acting when the rotor head 4 rotates. Thus, in the present embodiment in which the air flow (wind) of exhaust air is directly blown to the portion into which the high-temperature air is concentrated to stir the high-temperature air by the ventilating fan 30 of the hub control panel 20A, a higher stirring effect can be obtained and the temperature distribution can be equalized.

By forming the circulation flow as described above, the air inside the rotor head body 41 is stirred and the temperature distribution is resolved, so that a wall surface temperature of the rotor head body 41 rises, and there is also a larger temperature difference between an outer surface temperature of the rotor head body 41 and a temperature inside the space portion 43.

Since the air temperature inside the space portion 43 is substantially the same as a temperature of outside air outside the head cover 42, a temperature difference of the temperature of the in-head air and the outer surface temperature of the rotor head body 41 with the temperature of outside air also increases.

As a result, heat dissipation from the rotor head body 41 on the high-temperature side to outside air on the low-temperature side is facilitated, and the exhaust heat in the rotor head 4 is effectively dissipated to outside. The in-head air temperature of the rotor head 4 thereby decreases.

That is, in the rotor head 4, the internal air temperature of the rotor head body 41 decreases. Thus, the temperature of the in-enclosure air of the hub control panel 20A vented by the ventilating fan 30 can be exchanged with the air having a lower temperature. Accordingly, the in-enclosure air can be easily maintained at a predetermined temperature or less, and the hub control panel 20A continues more stable operation.

When the air flow flows along the inner wall surface of the rotor head body 41, a flow speed (a surface flow speed) of the air flow along the inner wall surface of the rotor head body 41 increases. Accordingly, cooling of the in-head air can be also facilitated by an improvement in heat transfer performance caused by the increase in the surface flow speed.

As described above, with the aforementioned present embodiment, heat exhausting measures for increasing an amount of heat exchange between inside and outside of the rotor head body 41 by equalizing the temperature distribution of the in-head air and thereby increasing a temperature difference between the inner wall surface of the rotor head body 41 and outside air as well as heat exhausting measures for venting the exhaust heat in the hub control panel 20A to facilitate the heat dissipation can be obtained. As a result, the in-enclosure temperature is prevented from rising, thereby enabling stable operation of the hub control panel 20A installed inside the rotor head 4.

Second Embodiment

Figure 3:
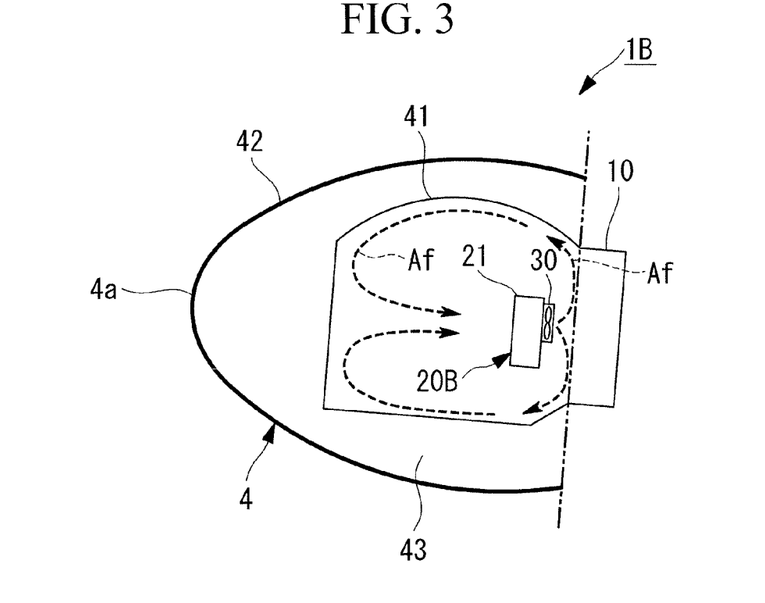
FIG. 3 is a schematic configuration view inside a rotor head showing a second embodiment of the wind power generating apparatus according to the present invention.

Next, a second embodiment of the wind power generating apparatus according to the present invention will be described based on FIG. 3. The same portions as those of the aforementioned embodiment are assigned the same reference numerals, and a detailed description thereof is omitted.

In a wind power generating apparatus 1B according to the present embodiment, the ventilating fan 30 installed on a hub control panel 20B in the rotor head body 41 is located at a different position. That is, the ventilating fan 30 is installed on a surface on the main bearing 10 side (the nacelle 3 side) in the rotation axial direction with respect to the enclosure 21 of the hub control panel 20B.

Also, the position of the ventilating fan 30 may be arranged so as to form an air flow in the rotation axial direction inside the rotor head body 41 in a similar manner to the aforementioned embodiment. However, the air flow in the rotation axial direction in the present embodiment is opposite to that of the aforementioned embodiment, and mainly flows to the main bearing 10 side as indicated by a dashed arrow Af in the drawing. The same exhaust fan as that of the aforementioned embodiment is also employed as the ventilating fan 30 in this case.

The air flow from the ventilating fan 30 installed as described above changes its direction with a flow path being blocked by the inner wall of the rotor head body 41 on the main bearing 10 side, is turned back along the inner wall surface of the rotor head body 41, and becomes a circulation flow that passes through the center portion of the rotor head body 41 from the leading end of the rotor head body 41.

When the configuration as described above is employed, the heat exhausting measures for increasing the amount of heat exchange between inside and outside of the rotor head body 41 with the above circulation flow effectively stirring the in-head air and equalizing the temperature distribution as well as the heat exhausting measures for venting the exhaust heat in the hub control panel 20B to facilitate the heat dissipation can be also obtained in a similar manner to the aforementioned first embodiment. As a result, the in-enclosure temperature is prevented from rising, thereby enabling stable operation of the hub control panel 20B installed inside the rotor head 4.

Third Embodiment

Figure 4:
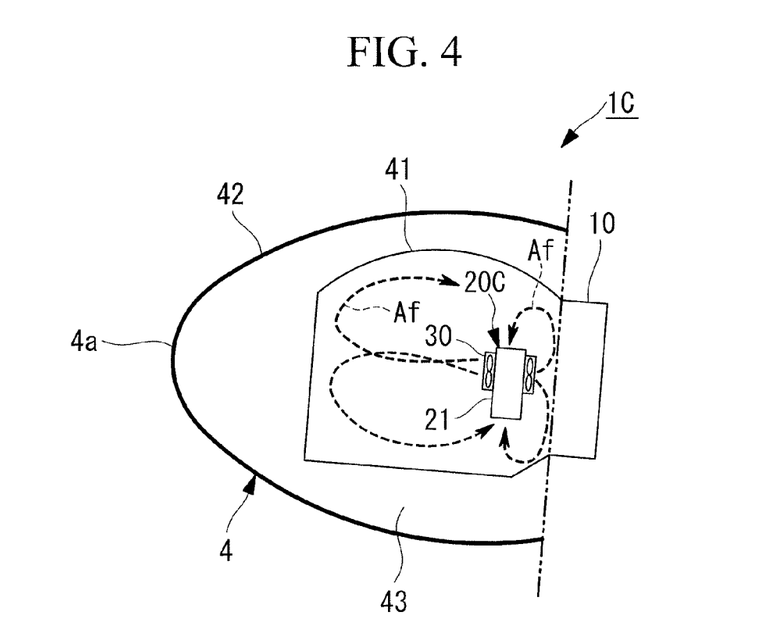
FIG. 4 is a schematic configuration view inside a rotor head showing a third embodiment of the wind power generating apparatus according to the present invention.

Next, a third embodiment of the wind power generating apparatus according to the present invention will be described based on FIG. 4. The same portions as those of the aforementioned embodiment are assigned the same reference numerals, and a detailed description thereof is omitted.

In a wind power generating apparatus 1C according to the present embodiment, a different number of ventilating fans 30 are installed on a hub control panel 20C in the rotor head body 41. That is, the ventilating fans 30 are installed on both the surface on the rotor head leading end 4a side in the rotation axial direction and the surface on the main bearing 10 side (the nacelle 3 side) in the rotation axial direction with respect to the enclosure 21 of the hub control panel 20C.

Also, the positions of the two ventilating fans 30 are preferably arranged so as to form an air flow in the rotation axial direction inside the rotor head body 41 in a similar manner to the aforementioned embodiments. The air flow in the rotation axial direction in the present embodiment is in the same direction as that of the first embodiment, and mainly flows to the rotor head leading end 4a side as indicated by a dashed arrow Af in the drawing. The same exhaust fan as that of the aforementioned embodiment is also employed as the ventilating fans 30 in this case.

When the configuration as described above is employed, the heat exhausting measures for increasing the amount of heat exchange between inside and outside of the rotor head body 41 with the circulation flow of the in-head air equalizing the temperature distribution of the in-head air as well as the heat exhausting measures for venting the exhaust heat in the hub control panel 20C to facilitate the heat dissipation can be also obtained in a similar manner to the aforementioned embodiments. As a result, the in-enclosure temperature is prevented from rising, thereby enabling stable operation of the hub control panel 20C installed inside the rotor head 4. In this case, the position of the air inlet is not specifically limited, and one or a plurality of air inlets may be provided at an appropriate position of the enclosure 21.

As described above, the ventilating fan 30 in the present embodiment may be installed on at least one surface out of the opposing surfaces of the enclosure 21 in the rotation axial direction. That is, the installation surface of the ventilating fan 30 in the enclosure 21 may be any of the surface on the rotor head leading end 4a side in the rotation axial direction, the surface on the main bearing 10 side in the rotation axial direction, or the opposing surfaces on the rotor head leading end 4a side and on the main bearing 10 side in the rotation axial direction.

Although the ventilating fan in the aforementioned embodiments is the exhaust fan that discharges the in-enclosure air from the enclosure 21, a suction fan that sucks in the in-head air into the enclosure 21 and thereby discharges the in-enclosure air from an air outlet may be also employed.

Please note that the present invention is not limited to the aforementioned embodiments, and may be appropriately changed without departing from the scope.

The invention claimed is:

1. A wind power generating apparatus in which a rotor head that rotates upon receiving wind power on a wind turbine blade drives a generator that is installed inside a nacelle and thereby generates electric power, the nacelle is installed on an upper end portion of a tower that is erected on a foundation, and a heat generating device is installed inside the rotor head,
wherein the rotor head includes a rotor head body accommodating the heat generating device and having a sealed structure from outside air, and
wherein a ventilating fan that forms a flow of air inside and outside of an enclosure of the heat generating device is provided in the enclosure.

2. The wind power generating apparatus according to claim 1, wherein the ventilating fan is arranged so as to form an air flow passing through a center portion in the rotor head.

3. The wind power generating apparatus according to claim 1, wherein the heat generating device is arranged adjacent to an axis of the rotor head.

4. The wind power generating apparatus according to claim 1, wherein the ventilating fan is installed on at least one surface out of opposing surfaces of the enclosure in a rotation axial direction.

5. The wind power generating apparatus according to claim 1, wherein the ventilating fan blows air inside the enclosure of the heat generating device toward a center portion in the rotor head.

6. The wind power generating apparatus according to claim 1, wherein the ventilating fan blows air inside the enclosure of the heat generating device toward a nacelle-side wall surface in the rotor head.

7. The wind power generating apparatus according to claim 1, wherein the ventilating fan is an exhaust fan that allows air inside the enclosure to flow out of the enclosure, and a pressure loss element is mounted to an air inlet of the enclosure.

8. A device, comprising:
a wind turbine rotor head, wherein
the rotor head includes a rotor head body,
an enclosure is located within the rotor head body, and
the wind turbine rotor head is configured to exchange air between (i) an outside the enclosure inside the rotor head body and (ii) the inside of the enclosure, without effectively exchanging air with an outside of the rotor head body.

9. The device of claim 8, wherein:
the rotor head body forms a sealed structure from outside air.

10. The device of claim 8, wherein:
the enclosure is an enclosure of a heat generating device.

11. The device of claim 8, wherein:
the rotor head is part of a wind turbine;
rotor blades are mechanically coupled to the rotor head; and
the wind turbine is configured such that rotation of the rotor head due to wind power drives a generator, thereby generating electric power.

12. The device of claim 11, wherein:
the generator is installed in a nacelle; and
the nacelle is installed on an upper end portion of a tower that is erected on a foundation, and a heat generating device is located inside the enclosure.

13. The device of claim 8, wherein:
rotor head is configured such that a ventilating fan forms a flow of air inside and outside of the enclosure; and
a heat generating device is located in the enclosure.

14. The device of claim 8, wherein:
rotor head is configured such that the air that is exchanged is directed, at least one of before or after being exchanged, through a rotational center of the rotor head, the air directed through the rotational center of the rotor head being free to flow within the rotor head body.

* * * * *